United States Patent
Rogers et al.

(10) Patent No.: US 10,871,555 B1
(45) Date of Patent: Dec. 22, 2020

(54) ULTRASONIC SENSOR

(71) Applicant: Apple Inc., Cupertino, CA (US)

(72) Inventors: Gregory E. Rogers, San Jose, CA (US); Charles L. Greenlee, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 796 days.

(21) Appl. No.: 15/368,135

(22) Filed: Dec. 2, 2016

Related U.S. Application Data

(60) Provisional application No. 62/262,152, filed on Dec. 2, 2015.

(51) Int. Cl.
| | |
|---|---|
| *G01S 15/00* | (2020.01) |
| *G01S 7/524* | (2006.01) |
| *G01S 15/931* | (2020.01) |
| *G10K 11/34* | (2006.01) |

(52) U.S. Cl.
CPC ............ *G01S 7/524* (2013.01); *G01S 15/931* (2013.01); *G10K 11/346* (2013.01)

(58) Field of Classification Search
CPC ...... G01S 7/524; G01S 15/931; G10K 11/346
See application file for complete search history.

(56) References Cited

U.S. PATENT DOCUMENTS

| | | | | |
|---|---|---|---|---|
| 4,180,792 A | * | 12/1979 | Lederman | B06B 1/0622 342/380 |
| 4,336,540 A | | 6/1982 | Goodwin et al. | |
| 4,870,971 A | * | 10/1989 | Russell | G01S 7/52047 600/447 |
| 5,115,416 A | * | 5/1992 | Gehlbach | H04B 11/00 367/103 |
| 6,327,221 B1 | * | 12/2001 | Gualtieri | G01S 15/04 181/142 |
| 7,106,180 B1 | * | 9/2006 | Pompei | A01M 29/18 116/22 A |
| 7,518,779 B2 | * | 4/2009 | Wasilousky | G02F 1/113 359/240 |
| 8,310,376 B2 | * | 11/2012 | Frank | G01S 15/931 340/932.2 |
| 8,363,511 B2 | * | 1/2013 | Frank | G01S 15/104 367/101 |
| 8,416,641 B2 | * | 4/2013 | Horsky | G01S 15/325 367/99 |
| 9,323,397 B2 | * | 4/2016 | Boser | G06F 3/043 |
| 9,488,725 B2 | * | 11/2016 | Max | G01S 15/931 |
| 10,446,938 B1 | | 10/2019 | Wang et al. | |

(Continued)

*Primary Examiner* — Krystine E Breier
(74) *Attorney, Agent, or Firm* — Polsinelli PC

(57) ABSTRACT

Implementations described and claimed herein provide systems, apparatuses, and methods for ultrasonic object detection. In one embodiment, a sensor includes at least two transducers driven by a common waveform generator and configured to process received echoes, from an object, using a common echo detector. By providing the wavefront 180 degrees out of phase to one transducer relative to the other transducer, a dual detection lobe may be provided and thereby provided two detection volumes. By varying the phase delay from one transducer relative to other, the detection beam (volume) may be steered or swept. Without phase delay, a relatively higher strength acoustic detection signal may be transmitted by the two or more transducers.

17 Claims, 13 Drawing Sheets

(56) References Cited

U.S. PATENT DOCUMENTS

| | | |
|---|---|---|
| 2002/0131608 A1* | 9/2002 | Lobb .................. H04R 1/403 |
| | | 381/111 |
| 2012/0105268 A1 | 5/2012 | Smits et al. |
| 2013/0214918 A1* | 8/2013 | Schumann ............. G01S 13/02 |
| | | 340/435 |
| 2015/0253420 A1 | 9/2015 | Alland |
| 2016/0025839 A1 | 1/2016 | Trummer |
| 2016/0146931 A1 | 5/2016 | Rao et al. |
| 2016/0209509 A1* | 7/2016 | Naruse ................ G01S 7/52004 |
| 2017/0120904 A1* | 5/2017 | Kentley ................ G10K 11/26 |
| 2018/0003819 A1* | 1/2018 | Koptenko ........... G01S 7/52096 |
| 2019/0025425 A1* | 1/2019 | Schmidt .............. G01S 15/931 |
| 2019/0186939 A1* | 6/2019 | Cox .................... G05D 1/0088 |

* cited by examiner

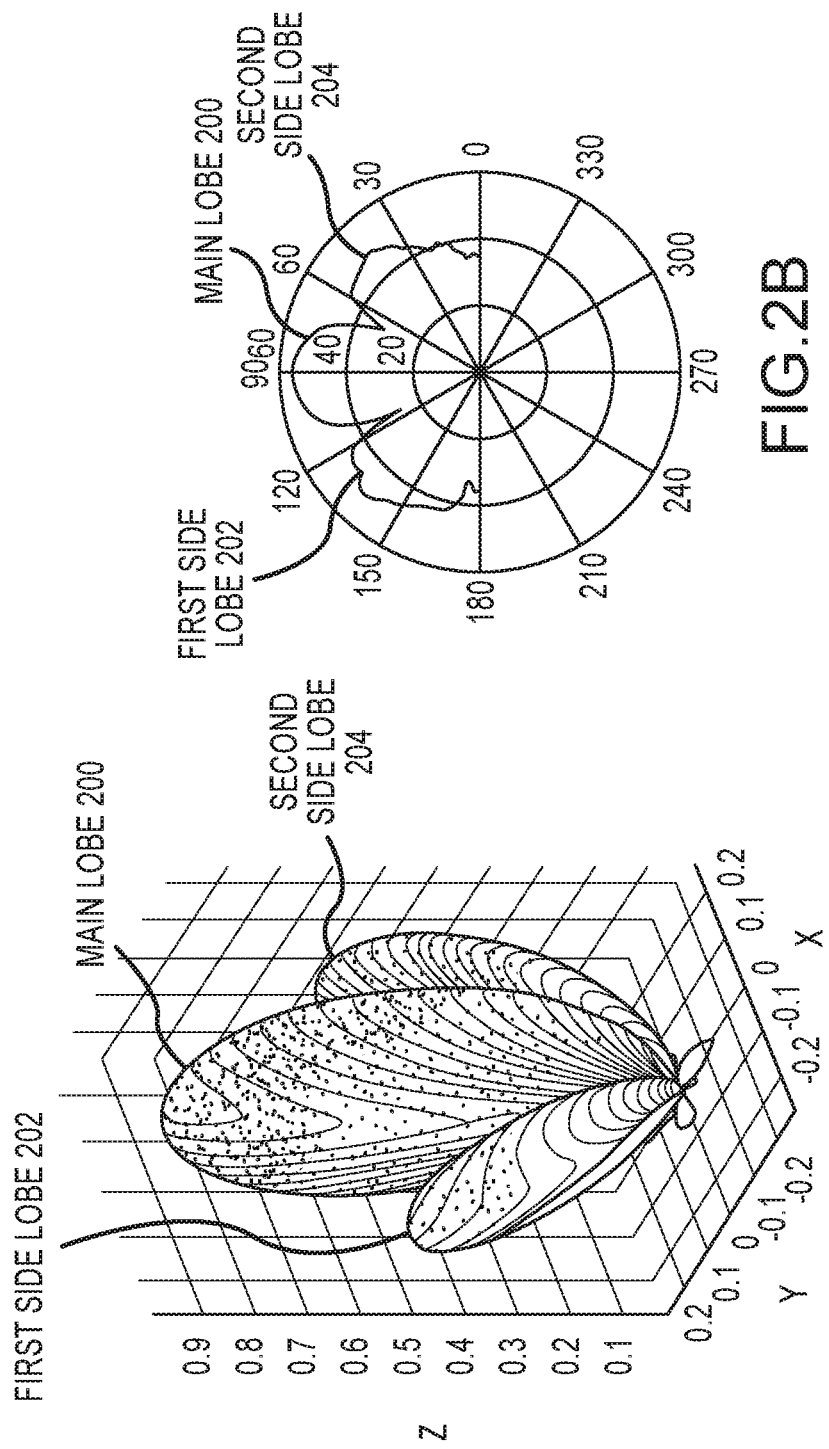

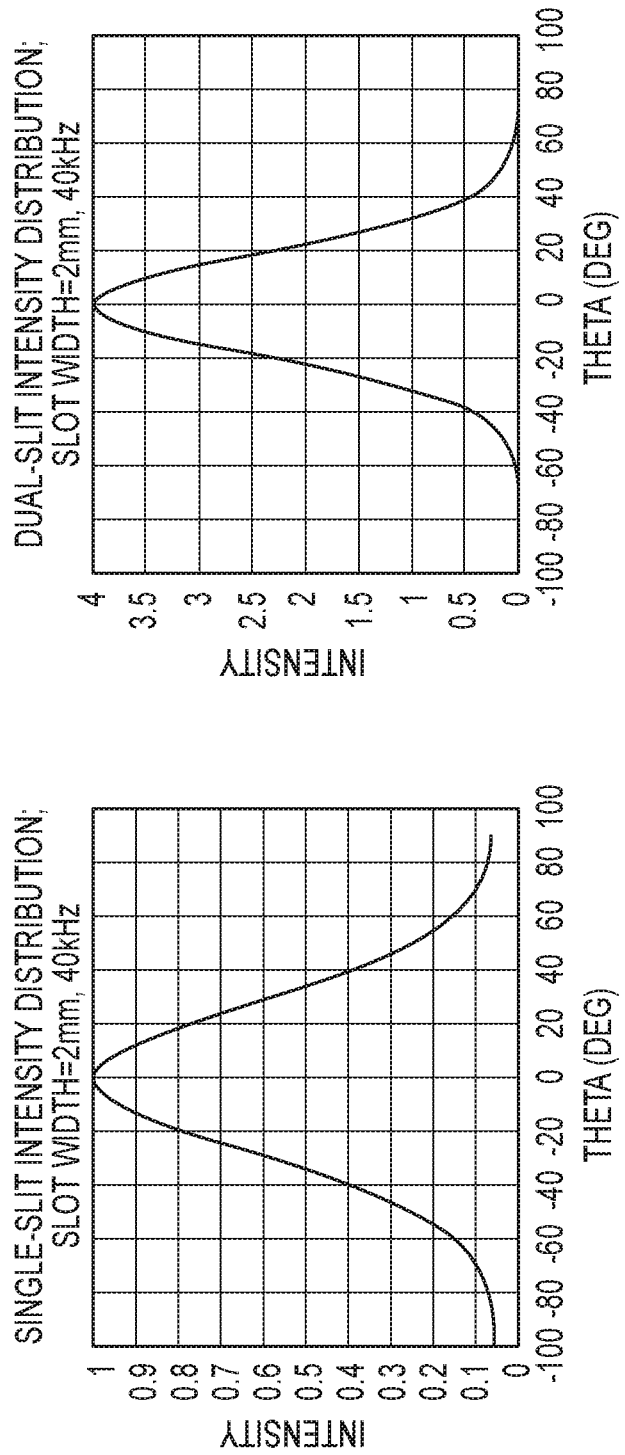

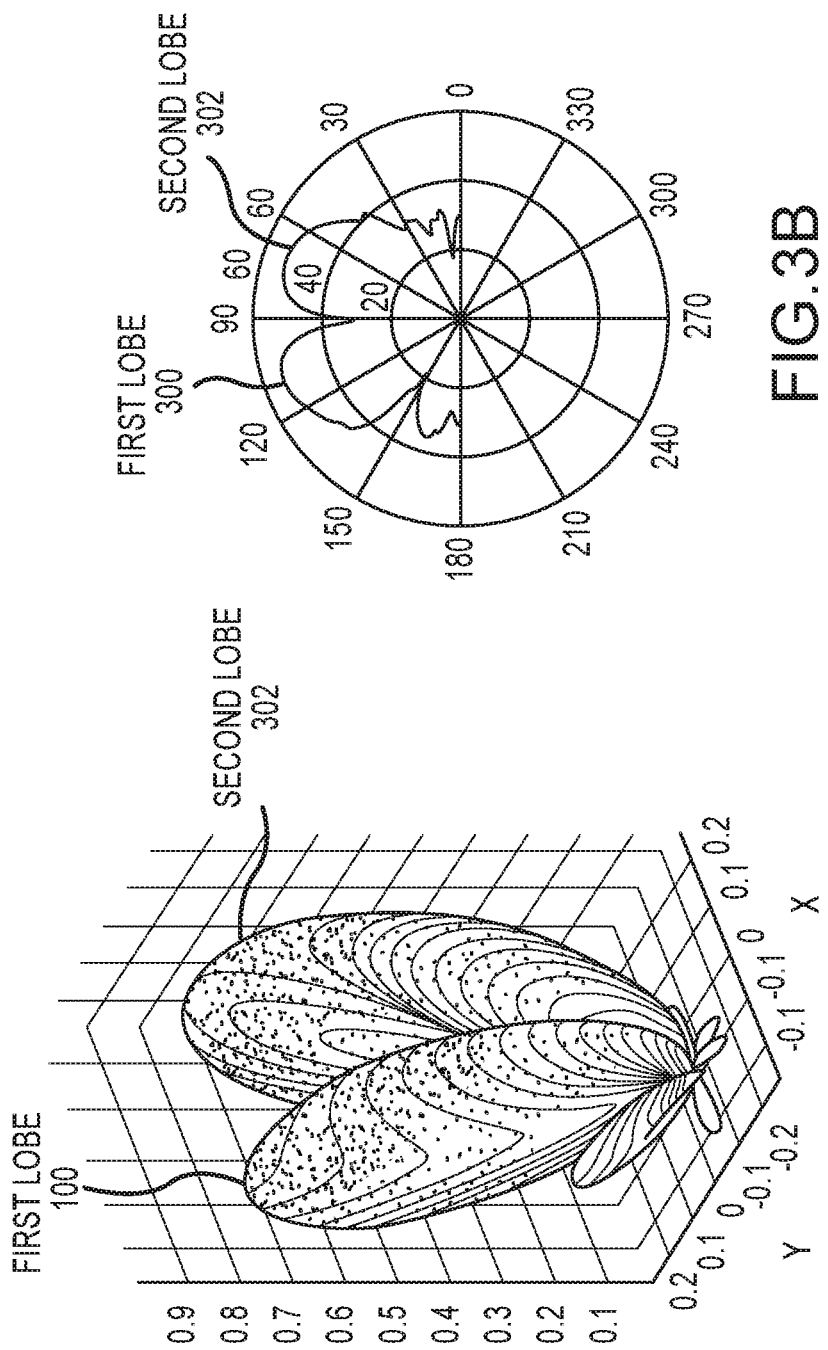

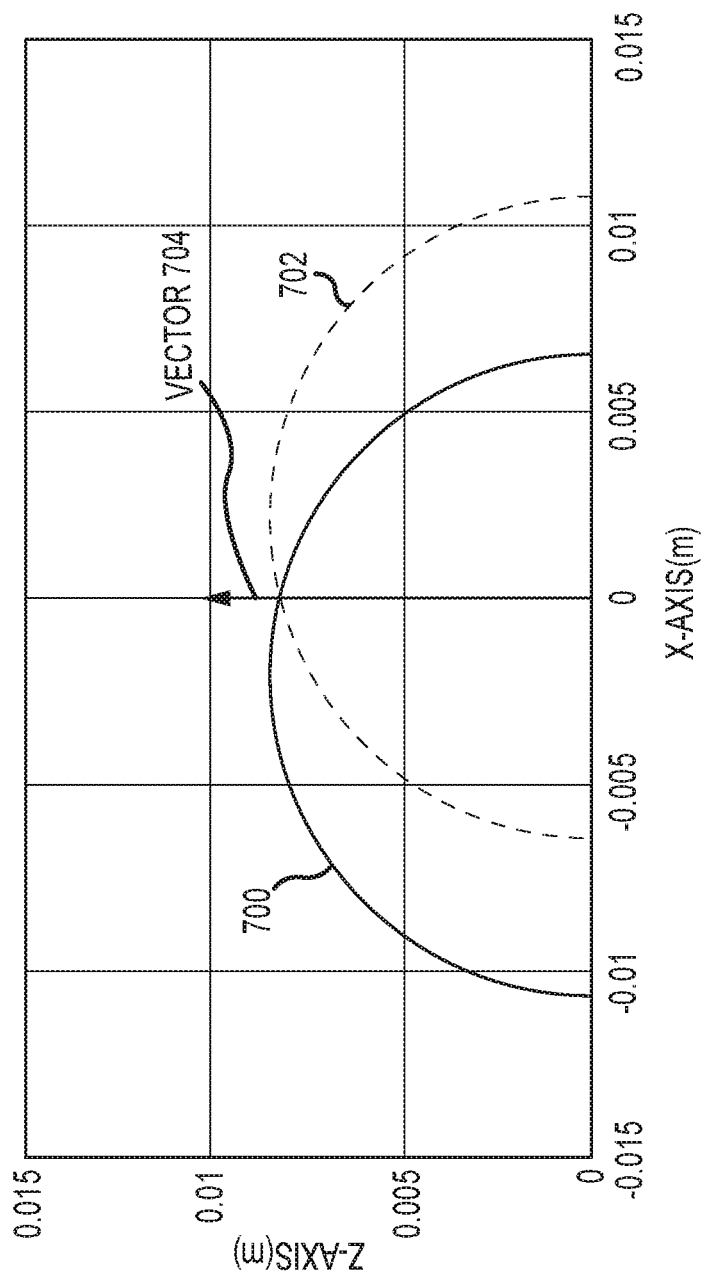

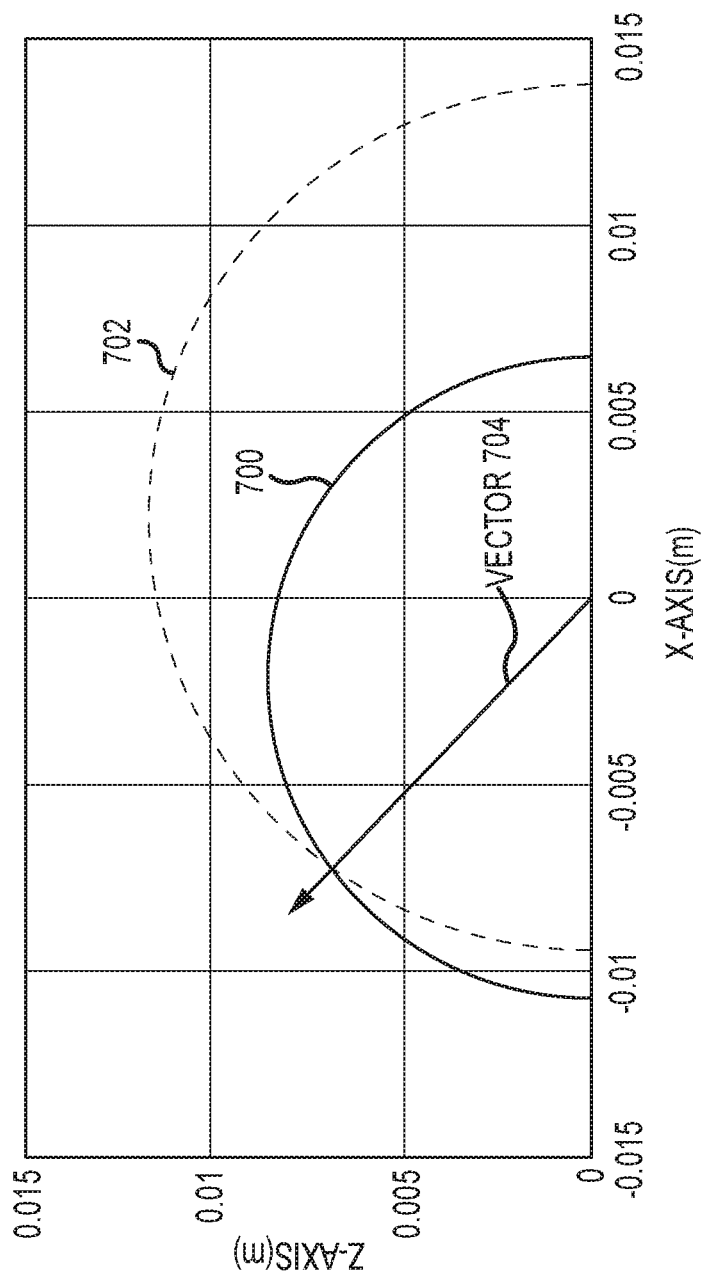

ULTRASONIC SENSOR

CROSS-REFERENCE TO RELATED APPLICATIONS

This patent application is related to and claims priority under 35 U.S.C. 119(e) to U.S. Provisional Patent Application No. 62/262,152, filed Dec. 2, 2015 entitled "ULTRASONIC SENSOR," "the entire contents of which is incorporated herein by reference for all purposes.

TECHNICAL FIELD

This disclosure relates generally to an ultrasonic sensor and more particularly to an ultrasonic sensor employing at least two transceivers coupled with a common signal generator, in one example.

BACKGROUND

Road vehicles use external ultrasonic sensors for obstacle detection. These sensors provide a static acoustic detection field to identify obstacles within the field of view of the ultrasonic sensor. Conventionally, the protection zone afforded (the volume within the field of view of the ultrasonic sensors and, thereby, the volume within which obstacles may be detected) by the external ultrasonic sensors may extend from a vehicle bumper outward to a few meters and from slightly below the bumper to a level typically about even with the tail lights or the bumper itself. A conventional ultrasonic sensor that may provide such a protection zone has a field of view that is conventionally 45° in the vertical plane and 75° in the horizontal plane. Such conventional sensor arrangements, however, are limited in range and limited in vertical coverage. Extending the range often comes at the cost of horizontal or vertical coverage.

SUMMARY

In one embodiment, a sensor is provided that includes a housing supporting a first ultrasonic transceiver positioned adjacent a second ultrasonic transceiver. The sensors may be positioned in a vertical or horizontal orientation (relative to the intended mounted position of the sensor). Additional sensors may be provided, as well, such as in a two×two sensor array. Returning to the example sensor with a first and a second transceiver, a waveform generator is coupled with the first ultrasonic transceiver and the second ultrasonic transceiver and configured to provide a waveform for driving the first ultrasonic transceiver and the second ultrasonic transceiver. Further, an echo detector is coupled with the first ultrasonic transceiver and the second ultrasonic transceiver. Further, the sensor includes a first controllable phase delay element positioned to receive the waveform from the waveform generator and provide a phase delayed waveform to the first ultrasonic waveform. It is also possible to provide a reference (no delay waveform) to the first transceiver, and to vary the phase delay of the common waveform to the second ultrasonic transceiver. Further, the phase delay may sequenced to sweep or step the ultrasonic signal through an arc, which may be vertical, horizontal, or otherwise depending on how the sensor is positioned and/or how the transducers are relatively positioned and how waveform is delayed or advanced between the transducers.

These and various other features and advantages will be apparent from a reading of the following detailed description. Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

FIG. 2A is a three dimensional signal diagram illustrating an acoustic beam formed by the dual transducer sensor of FIGS. 1A and 1B with the signal waveform provided to both transceivers being in phase, in one embodiment;

FIG. 2B is a two-dimensional diagram illustrating the acoustic beam shown in FIG. 2A, in one embodiment;

FIG. 2C is a signal diagram illustrates the system gain of a dual-transducer sensor compared to a single transducer sensor, in one embodiment;

FIG. 3A is a three dimensional signal diagram illustrating a pair of acoustic beams formed by the dual transducer sensor of FIGS. 1A and 1B, with the signal waveforms provided to each transceiver being 180° out of phase, in one embodiment;

FIG. 3B is a two dimensional diagram illustrating the acoustic beam formed in FIG. 3B, in one embodiment;

FIG. 7A is a signal diagram of a dual transducer configuration, such as illustrated in FIGS. 1A and 1B, with zero phase offset, in one embodiment;

FIG. 7C is a signal diagram of a dual transducer configuration, such as illustrated in FIGS. 1A and 1B, with 127.28 degrees of phase offset (advanced) to steer the beam, in one embodiment.

DETAILED DESCRIPTION

Aspects of the present disclosure involve an ultrasonic sensor apparatus and associated systems, methods, and the like, for detecting objects, and particularly for detecting objects near a vehicle in one possible deployment of the sensor or collection of sensors. Such a sensor may provide detected object information for object detection and identification. One embodiment of the present disclosure may involve an integrated sensor module that provides two or more ultrasonic transducers, which may be both ultrasonic transmitters and receivers, i.e., transceivers, driven by common components. For example, the integrated sensor module may have common components in the form of a common waveform generator with a phase delay or phase advance provided to one or both of the two transducers. Acting as transceivers, each transducer may generate (or transmit) ultrasonic acoustic waves and detect echoes from any object (e.g., obstacle) from which the waves reflect. Integrating functional sensor components into a discreet module allows for placement in and on a vehicle in areas sometimes not suitable for simply adding more sensors, and provides enhanced form factors and reduced relative costs.

Aspects of the present disclosure involve enhancing the sensor's effective field of view while maintaining or increasing the detection range in comparison to conventional ultrasonic vehicle sensors. In one embodiment, such functional advances are provided by at least a pair of transducers arranged in a linear array, with components that provide a common waveform to each transducer but with one delayed (or advanced) in phase relative to the other in order to steer the ultrasonic detection beam (or beams). Further, using at least a pair of transducers and coordinated phase delay, provides for steering a detection beam through a detection area, and angular detection (separability) is provided as the echo strength increases as the beam steers toward an object and then decreases as the beam steers away from an object.

Figure 1A:
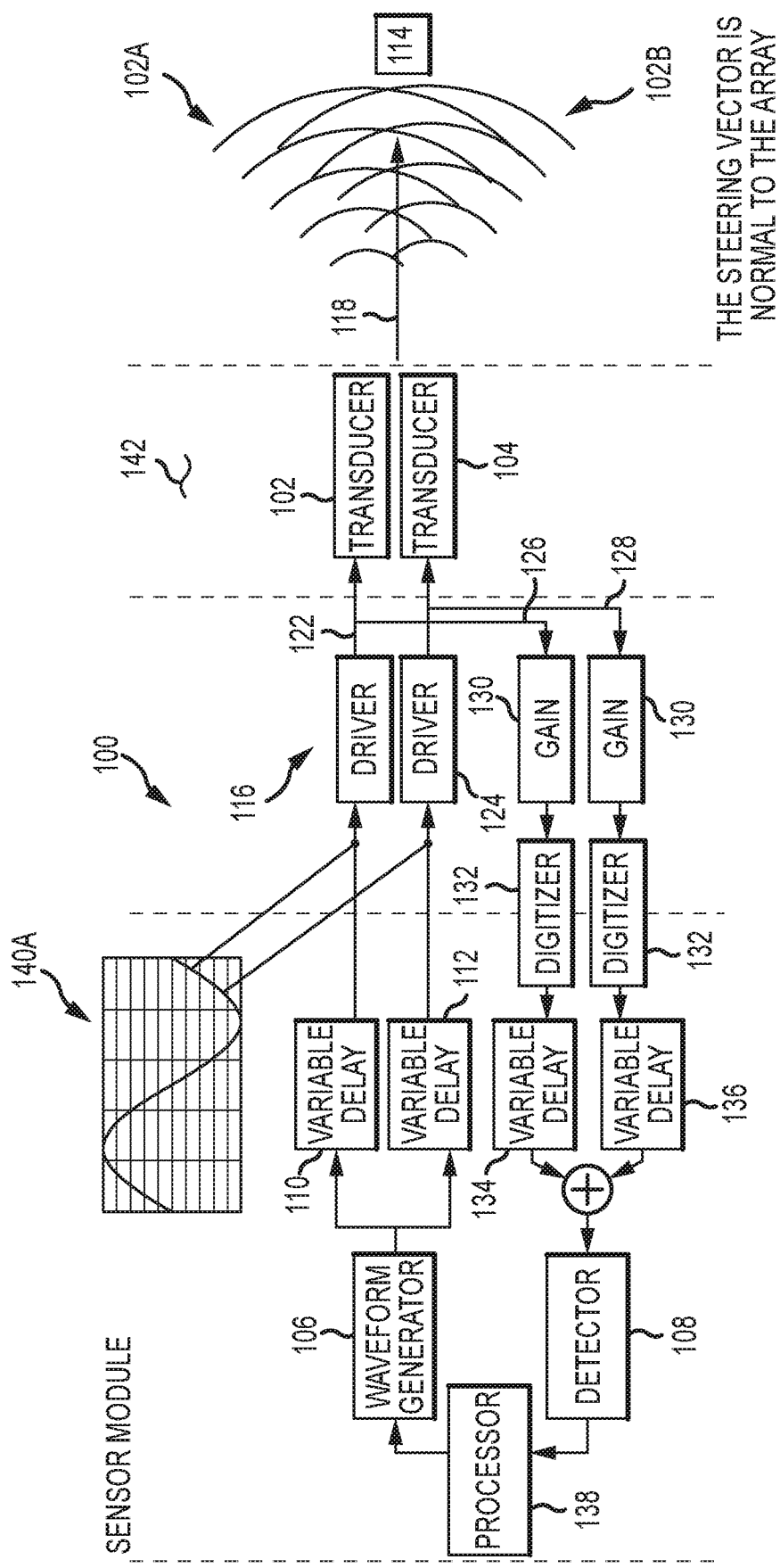
FIGS. 1A and 1B are schematic block diagrams of a dual transducer sensor that uses a common waveform generator and common echo detector, and other electronic components, in one embodiment, with FIG. 1A illustrating in-phase operation and FIG. 1B illustrating beam steering through phase delay between one transducer and the other.
Figure 1B:
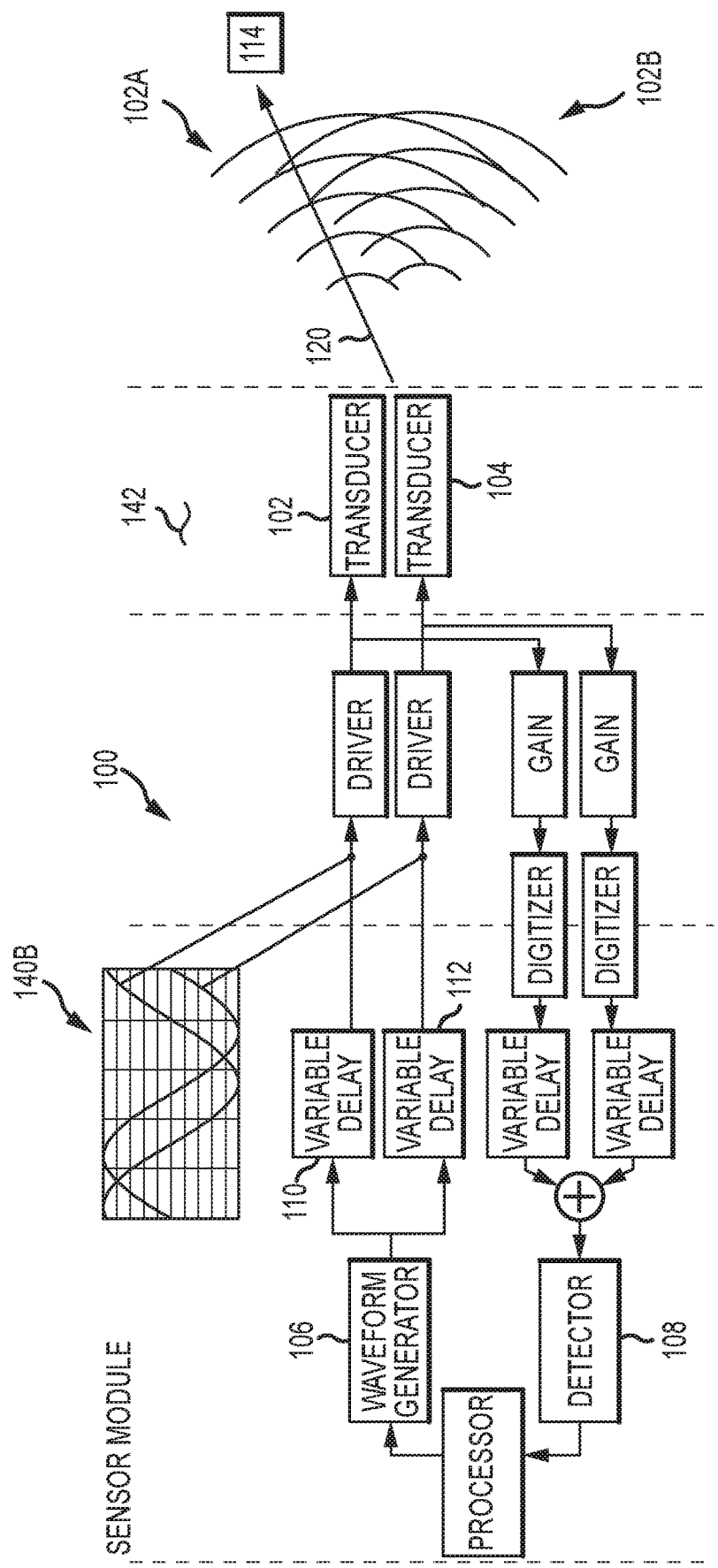

FIGS. 1A and 1B is a schematic block diagram of an example of an ultrasonic hazard detection sensor 100. The sensor is arranged to detect the presence of objects 114, which may pose a hazard to a vehicle or whatever structure the detection sensor is associated. In the example sensor 100 illustrated in FIG. 1, there are two transducers 102, 104 positioned adjacent each other, and those sensors may be positioned on a common face of a sensor housing 142. More particularly, FIG. 1A illustrates the operation of the sensor 100 with no phase offset (delay or advance) of the acoustic waveform 140A to each transducer whereas FIG. 1B illustrates the operation of the sensor with a phase delay (or advance) of the common waveform 140B to one transducer relative to the other where a steering vector 120 is modified based on the constructive interference between the channels. Each transducer may be a discrete electric element functioning as a transceiver. Thus, each transducer may both generate an ultrasonic acoustic wave (102A, 104A) and receive reflections or echoes from a detected object 114. To reduce cost and minimize the sensor packaging size, a common waveform generator 106 and echo detector 108 electronics may be used. To provide beam forming or beam steering, the waveform generator may provide a common waveform to each transducer with some relative delays before the common waveform provided by phase delay electronics 110, 112. In one example, phase delay may be provided by a controllable phase delay, which by adjusting the phase delay of the waveform to one transducer relative to the other, may steer the acoustic detection beam (e.g., as illustrated by a steering vector 118, 120). From the waveform generator, each transducer 102, 104 receives a waveform along a respective acoustic signal generation path 122, 124. The respective phase delay 110, 112 are in the respective paths 122, 124. Also in the acoustic signal generation path may be discrete driver components 116 to convert the waveform, from the delay circuits 110, 112, to each transducer 102, 104 into an appropriate drive signal. Each transducer is also connected to a common detector 108 through respective echo detection paths 126, 128. In the echo detection path (for each transducer), there may be a gain component 130 to amplify the detected echoes, a digitizer 132 to convert an analog signal into a digital signal, and a delay component 134, 136. The delay component 134, 136 may introduce delay in the detected echoes based on the variable delay induced in the signal generation path before providing the echoes to the common echo detector 108. As illustrated, the sensor may further include a processor 138 to control the waveform generator and process the detected echoes received at the detector 108. The common waveform generation, echo detection, phase delay, and other features may be provided on a common printed circuit board, and by an ASIC, or otherwise.

In a first example of operation, a common waveform 140 may be provided to each transducer 102, 104. In such an arrangement, as illustrated in FIGS. 2A and 2B, a main object detection lobe 200 is generated. FIG. 2C illustrates an intensity distribution 202 of a conventional signal transducer detector in comparison to an intensely distribution 204 of a dual transducer embodiment, with a 40 kHz transducer pair modeled as slits of 2 mm length and spaced apart about 4.3 mm, in one specific embodiment where the transducers are piezoelectric discs. In comparison to conventional automotive ultrasound detectors employing a single transceiver and a separate single receiver, the sensor 100 may provide a higher intensity detection lobe. Moreover, the sensor may steer the beam horizontally or vertically sweep the object detection lobe by varying the phase delay of one transceiver relative to the other, the detection beam may be steered vertically (up-and-down) or horizontally (side-to-side).

Figure 5:
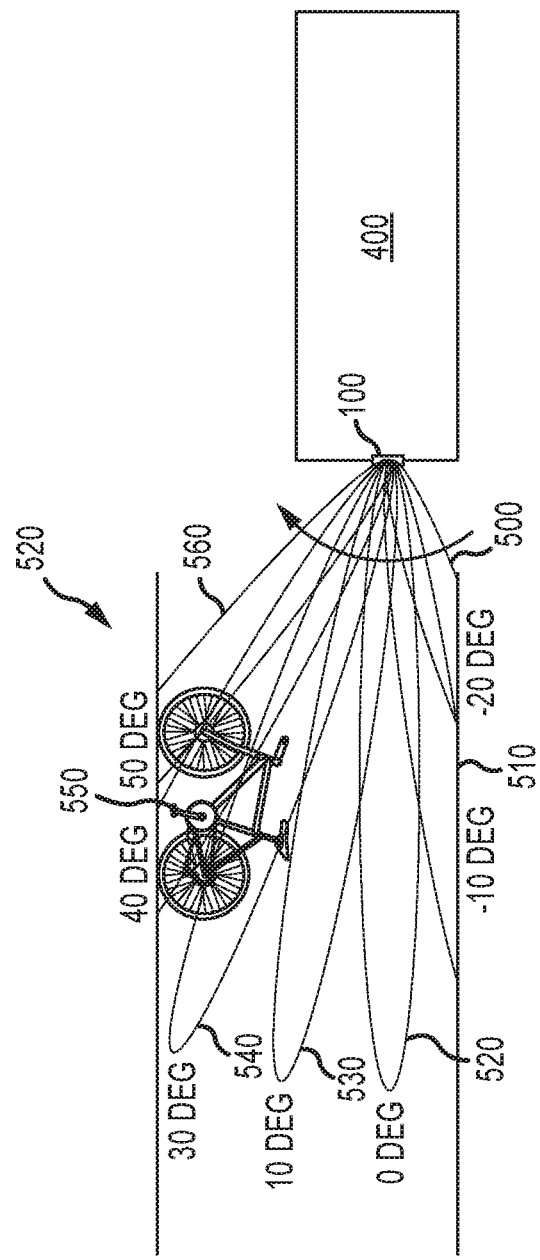
FIG. 5 is a side view of a vehicle operating with a hazard detection sensor at the front of the vehicle, the hazard detection sensor scanning through a vertical arc by sequencing the phase delay between two transceivers to steer the scanning beam upwardly and downwardly, in one embodiment.

For example, FIG. 5 illustrates a vehicle 300 with a sensor 100 integrated into a front fascia, bumper, or other forward facing component of the vehicle. In this illustration, a bicycle 370 is shown hanging from hooks on a ceiling of a garage. A conventional forward facing non-sweeping ultrasonic sensor, is unlikely to detect such an obstacle because the field of view is vertically limited. However, by vertically scanning the main detection lobe 200, a relatively larger vertical field of view is comprehensively provided as the lobe is scanned upward and downward. In the specific example shown, there are seven discrete scanning lobes (500, 510, 520, 530, 540, 550, 560). In such an implementation, the most forward extending lobe 520 is generated with no phase delay between the transceivers (labeled 0 deg). The lower two scanning lobes (500, 510) are created by two distinct phase delays of the common signal between the transceivers (e.g., −20 degrees for the lower lobe and −10 degrees for the lobe adjacent the 0 degree lobe). These are achieved through −61.7 degree phase difference between transducer 102 and 104, and a −31.3 degree phase difference, respectively. The upper four scanning lobes (530-560) are created by four distinct phase delays between the transceivers to achieve various vertical relative degree (step size) orientations relative to horizontal (the main lobe). Depending on the relative phase delay, the lower lobes may be advanced whereas the upper lobes may be delayed, or alternatively the lower lobes may be delayed whereas the upper lobes may be advanced. In one specific example, phase delays are used to achieve a scanning lobe vector sweep with 10° degrees of separation between each of the seven scanning lobes (between adjacent or successive scanning lobes), except the third lobe with no phase delay. It can be seen that the fourth through seventh lobes are phase advances of 31.4 degrees, 61.7 degrees, 90.3 degrees, 116 degrees and 138.3 degrees, respectively, between the waveform provided to transducer 102 and 104, in one specific embodiment. In one possible example, to provide contiguous, or at least substantially contiguous, detection volumes across a vertical (or horizontal) field of view, the minimum lobe step size is the lobe half-power beam width. A finer angular resolution (smaller beam width) would involve more steps.

In addition to providing a relatively larger vertical sweep, additional object details may be obtained by comparing relative echo strength between the detection lobes. Referring again to FIG. 5, it can be seen that the fourth detection lobe intersects only a small portion of the seat of the hanging bicycle. The fifth (540) and sixth (550) detection lobes intersect significant structural features of the bicycle. The seventh detection lobe intersects approximately half of the front tire of the hanging bicycle. Accordingly, the echo strength of the fourth lobe would be very small whereas the echo strength of the fifth and sixth lobes would be relatively larger and the echo strength of the final lobe may be less than half of the fifth and sixth lobes. Further, side lobe levels vary with separation distance, with one possible optimal side lobe level being minimized in a minimum distance scenario as illustrated in FIG. 2C, which may be supplemented or otherwise used in conjunction with shading techniques.

Figure 4:
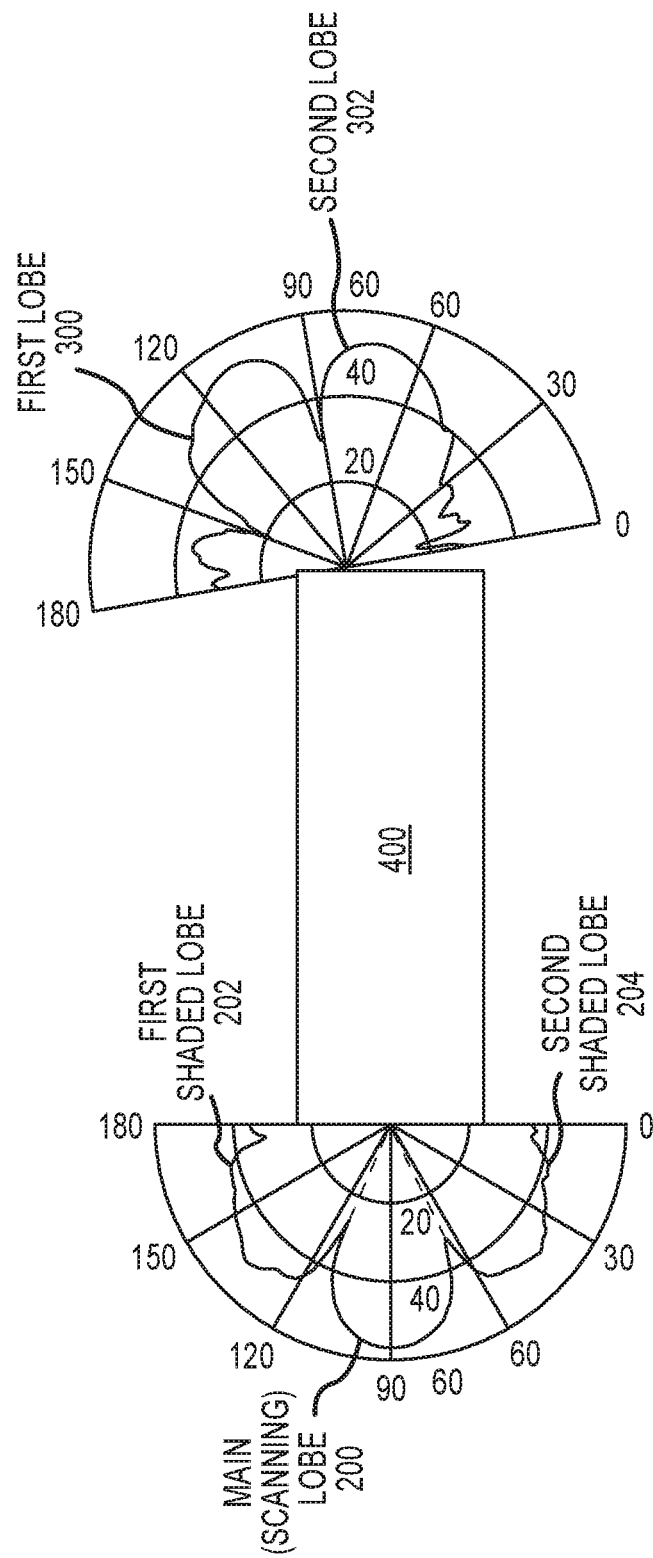
FIG. 4 is a side view of a vehicle having a hazard detection sensor at the front of the vehicle and at the back of the vehicle and configured to detect objects in the front and rear, the hazard detection sensor at the front of the vehicle operating with both transceivers in phase and the hazard detection sensor at the rear of the vehicle operating with the transceivers 180° out of phase, in one embodiment.

FIGS. 2A, 2B and 4 illustrate a first side lobe 202 and a second side lobe 204 adjacent to the main lobe. As illustrated in FIG. 4, through shading techniques, the first and second side lobes may be significantly reduced or eliminated. The term "shading" reflects a variety of techniques that may be employed to suppress, filter, or otherwise reduce the prominence of the side lobes. Given their relative prominence, shading the side lobes may help reduce interference, false positives and otherwise simplify object detection by the main lobe and associated electronics of the sensor 100.

Referring now to FIGS. 3A, 3B and 4, it can be seen that by introducing about a 180° phase delay between the common waveform used to generate acoustic signals from the pair of transducers, two prominent or main detection lobes 300, 302 are provided by the sensor 100. In such an arrangement, significantly greater vertical coverage is provided relative to a similar power single transducer sensor. Moreover, the greater vertical coverage may be provided without sacrificing range. It should be recognized that if the two-transducer sensor array is positioned such that the transducers are horizontally positioned relatively (rather than vertically), then the sensor provides greater horizontal coverage relative to a similar power single transducer sensor, and this is achieved without sacrificing range. Through relatively small phase delays between the waveform provided to the transducers, the lobes may be adjusted or swept upwardly and downwardly relative to how illustrated in FIG. 4. In such an arrangement, objects along a roadway or other drive surface may be detected, curbs may be identified, curb height may be computed, objects above the bumper and roofline may be detected, and other functions realized, particularly using a dual lobe approach.

It should be recognized, that while two transducers are illustrated in the sensor discussed herein, it is possible to include one or more additional transducers. Additionally, the transducers are illustrated as being adjacent to each other and vertically stacked. Such an arrangement provides for vertical sweeping and vertically stacked lobes as illustrated in the front sensor arrangement and rear sensor arrangement, respectively, of FIG. 4. It is also possible to position transducers horizontally to provide horizontal sweeping. It is further possible to use a two×two (2×2) transducer array to sweep vertically and horizontally, generally extend the range and detection volume relative to an in-phase one×one (1×1) transducer package, and/or generally reduce the number of sensor packages required to provide object detection.

It should be noted, that while FIG. 4 and FIG. 5 illustrate object detection by projecting corresponding detection lobes extending from the front and rear of the vehicle, it is possible to employ various combinations of sensors and positioning of the same type on the vehicle to detect objects to the sides of the vehicle and generally all around the vehicle. Moreover, it is possible to use the sensors in different modes of operation. For example, a static dual lobe coverage may be provided around the vehicle identifying objects within the range of the sensor and extending from the ground upward to a position above the roof line or adjacent to the roof line of most conventionally scaled passenger vehicles. In such an implementation, two "donuts" or toroid's of object detection would be provided around the vehicle. Additionally, employing phase delay between the sensors, the relative position of the lobes or lobe scanning may be achieved with any sensor, combination of sensors, or all sensors.

Figure 6:
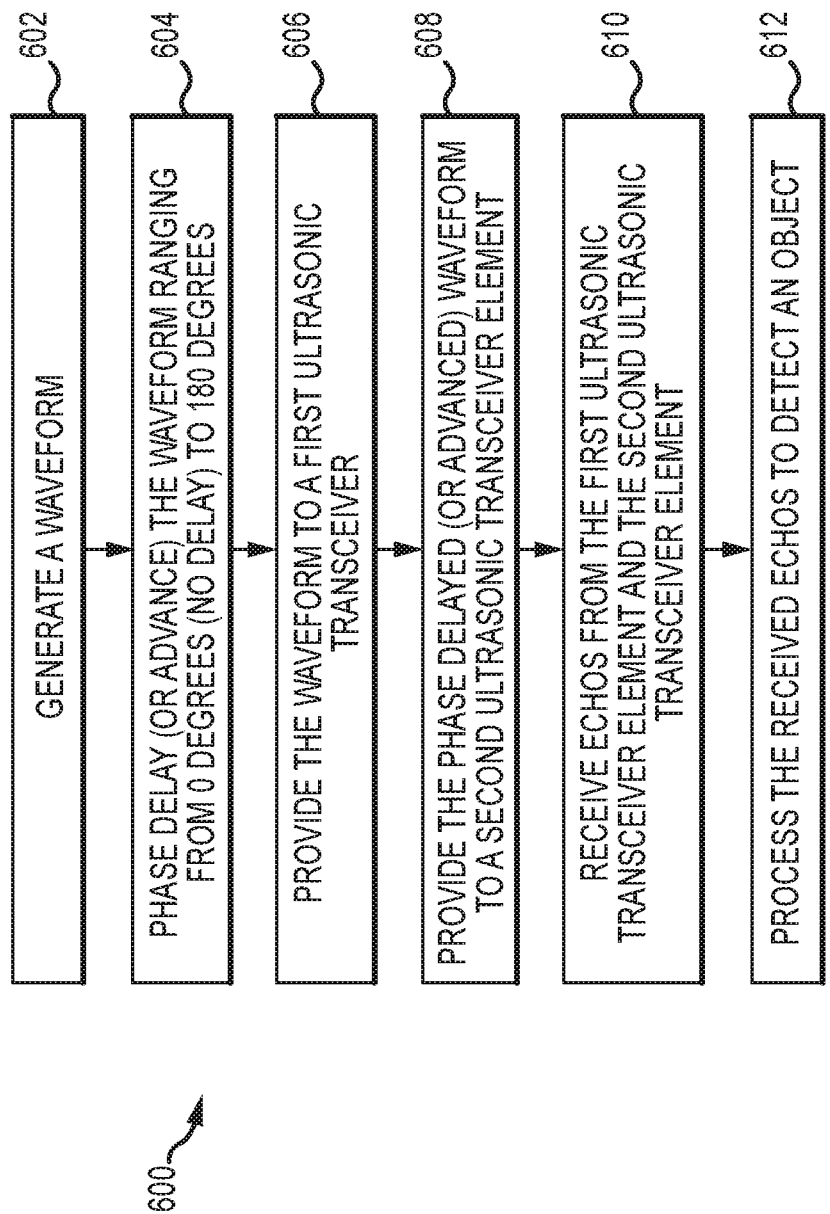
FIG. 6 is a flowchart illustrating a method of ultrasonic object detection, in one embodiment.

FIG. 6 illustrates a flowchart of one possible method of object detection using the sensor introduced in FIG. 1 and otherwise discussed herein, in various embodiments. To begin, a waveform is generated, which may be from a common waveform generator (operation 602). In one example, the waveform is phase delayed (and/or advanced) to one transducer or the other transducer to provide various operational modes (operation 604). For example, in one possible operational mode, no phase delay is provided and a single detection lobe is generated. In another possible operational mode, the waveform is sequenced through a series of phase delays between each transducer to sweep the detection lobe through a corresponding sequence of discrete detection lobes. When the sensor is mounted on a vehicle, the lobe may be swept vertically (up and down) by advancing the phase or delaying the phase. Alternatively, if the sensor is mounted such that the transducers are in positioned side-by-side (instead of vertically stacked), then the lobe may be swept horizontally. In one example, the phase is controlled for one transducer. In another example, phase delays (or advances) are provided to the waveform for each transducer in a cooperative manner. In any event, the waveform is provided to the first transceiver and the phase altered waveform is provided to the second transceiver (operations 606 and 608). If the sensor has additional transducers, then a variety of different scanning modes, ranges and volumes may be achieved by controlling phase delay (or advances) between transducers.

A first ultrasonic acoustic signal and a second ultrasonic acoustic signal are thereby emanated from the respective first and second ultrasonic transceivers. In an embodiment with a third, fourth, etc., transceiver, respective third, fourth, etc., signals emanated from the transceivers. Similarly, phase delays ranging between 0 and 180 degrees may be introduced to the waveform provided to the additional transceivers. In such arrangements, lobes may be provided and or swept, and sweeping may be vertical, or horizontal, or otherwise depending on circumstances, operational mode, placement on vehicle and other considerations.

Being bi-directional or multi-directional, the transducers may receive echoes from any object within the lobe or lobes (operation 610). As with the waveform generator, a common echo detector 108 may be used. The echo detector may be configured to discriminate between lobes when the sensor is configured to provide distinct detection lobes. Echo direction may be determined through spatial transform techniques or the receive field of view may be steered much like the transmit beam is steered by varying phase delay between receive channels. The echoes may be processed in any number of ways (operation 612). Echo processing may be conducted internal to the sensor or echo signals may be provided at one or more outputs of the sensor for processing by computational processing units coupled with the sensor. For example, the sensor may process the echoes to detect an echo strength and when that strength exceeds a threshold indicating the presence of some object, generate an output indicating the same. In another example, echo signals may be provided to an external computational unit to provide object detection through signal profile comparisons to known objects such as curbs, and the like.

Figure 7B:
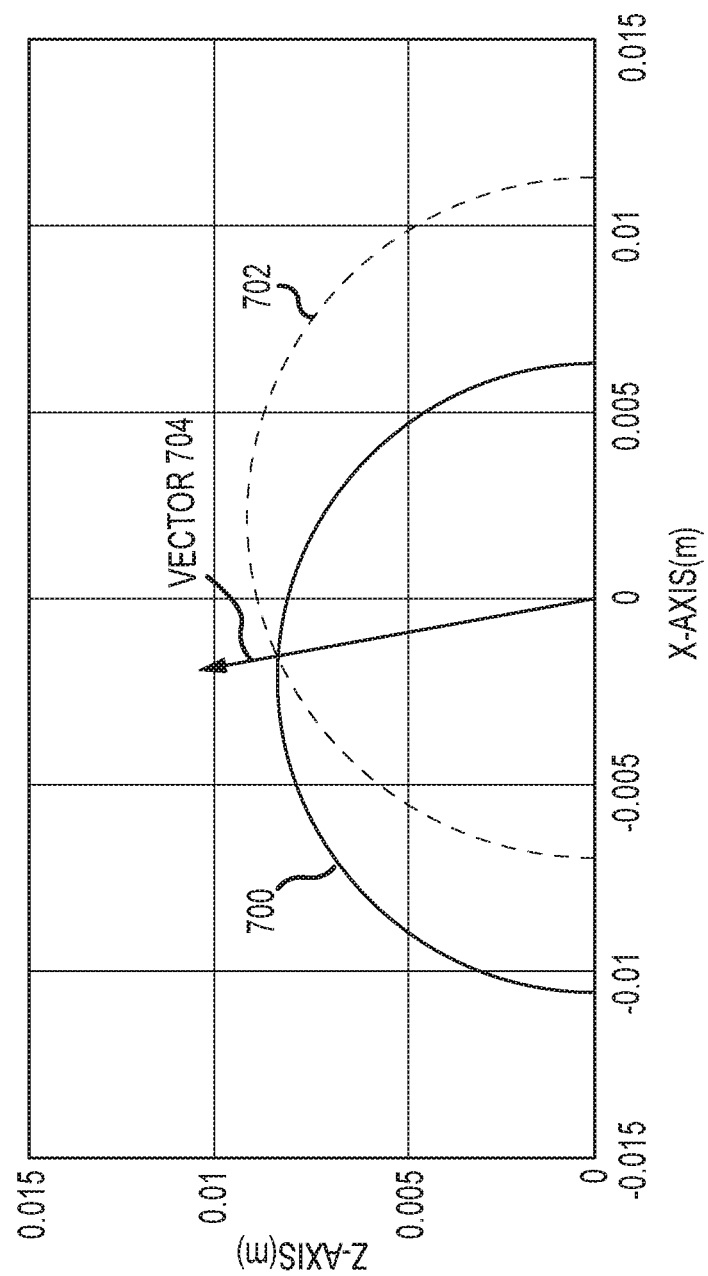
FIG. 7B is a signal diagram of a dual transducer configuration, such as illustrated in FIGS. 1A and 1B, with 31.25 degrees of phase offset (advanced) to steer the beam, in one embodiment.

FIGS. 7A-7C illustrate three examples of a reference wavefront 700 (e.g., that coming from transducer 102) relative to a phase advanced wavefront 702 (e.g., that coming from transducer 104) for a zero degree phase offset (7A), a 31.25 phase advanced wavefront (e.g., that coming from transducer 104 phase advanced relative to transducer 102) (7B), and a 127.8 degree phase advanced wavefront (7C). These constructive interference patterns are for a 2 mm length transducer pair spaced about 4.3 mm. These diagrams illustrate various examples of how phase delays may achieve beam steering where the detection vector 704 (for a detection lobe) identifies the primary direction of the lobe and where objects may be detected within the volume of the lobe.

Figure 8:
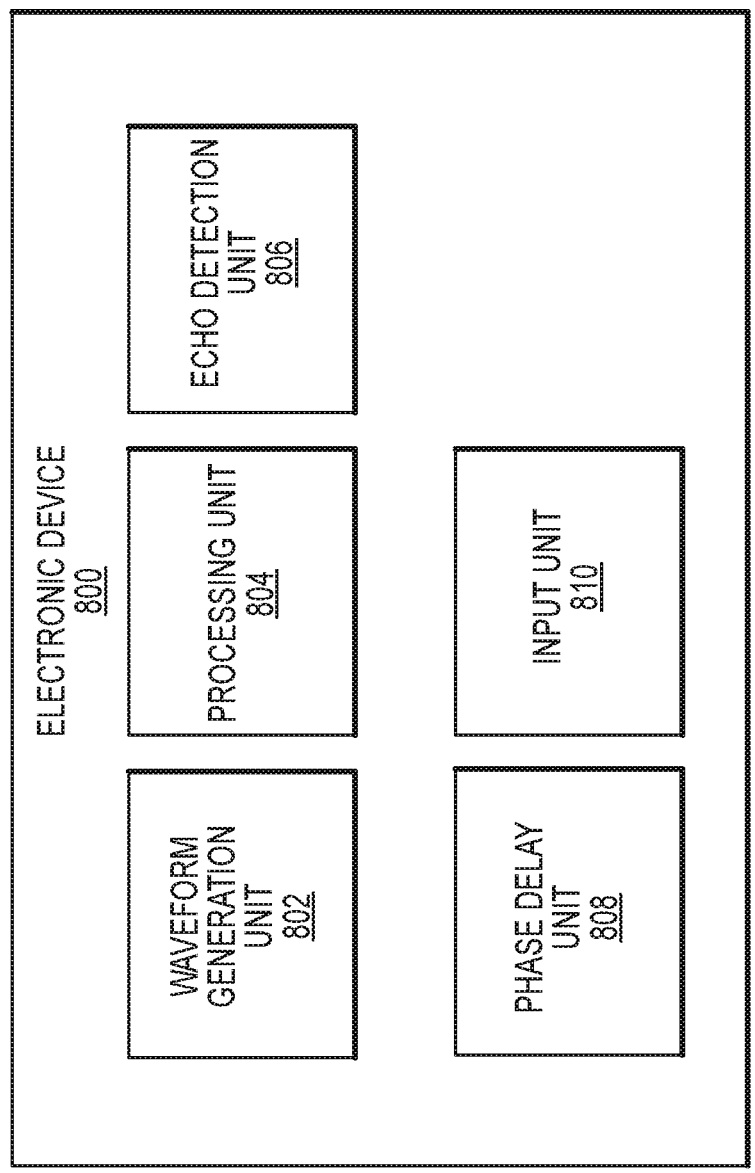
FIG. 8 is an example computing system that may implement various systems and methods of the presently disclosed technology.

Turning to FIG. 8 an electronic device 800 including operational units 802-810 arranged to perform various operations of the presently disclosed technology is shown. The operational units 802-810 of the device 800 are implemented by hardware or a combination of hardware and software to carry out the principles of the present disclosure. It will be understood by persons of skill in the art that the operational units 802-810 described in FIG. 8 may be combined or separated into sub-blocks to implement the principles of the present disclosure. Therefore, the description herein supports any possible combination or separation or further definition of the operational units 802-810. In one example, some or all operational units are implemented with an ASIC provided on a discrete printed circuit board (PCB) to which the transducers are coupled and which is mounted in a housing of the sensor. In one implementation, the transducers are circular plates mounted adjacent each other and co-planar to each other.

In one implementation, the electronic device 800 includes a processing unit 804 and an input unit 810 configured to receive data from one or more input devices or systems (e.g., the transducers, the echo detector, and the waveform generator). Various operations described herein may be implemented by the processing unit 804 using data received by the input unit 810 to output information for use by other computational units, or possibly for display.

Additionally, in one implementation, the electronic device 800 includes units implementing the operations described with respect to FIG. 6. For example, the operation 602 may be implemented by a waveform generation unit 802, and phase delay operation 604 may be implemented by a phase delay unit 808. Echoes may be received and processed (operations 610-612) by echo unit 806.

Figure 9:
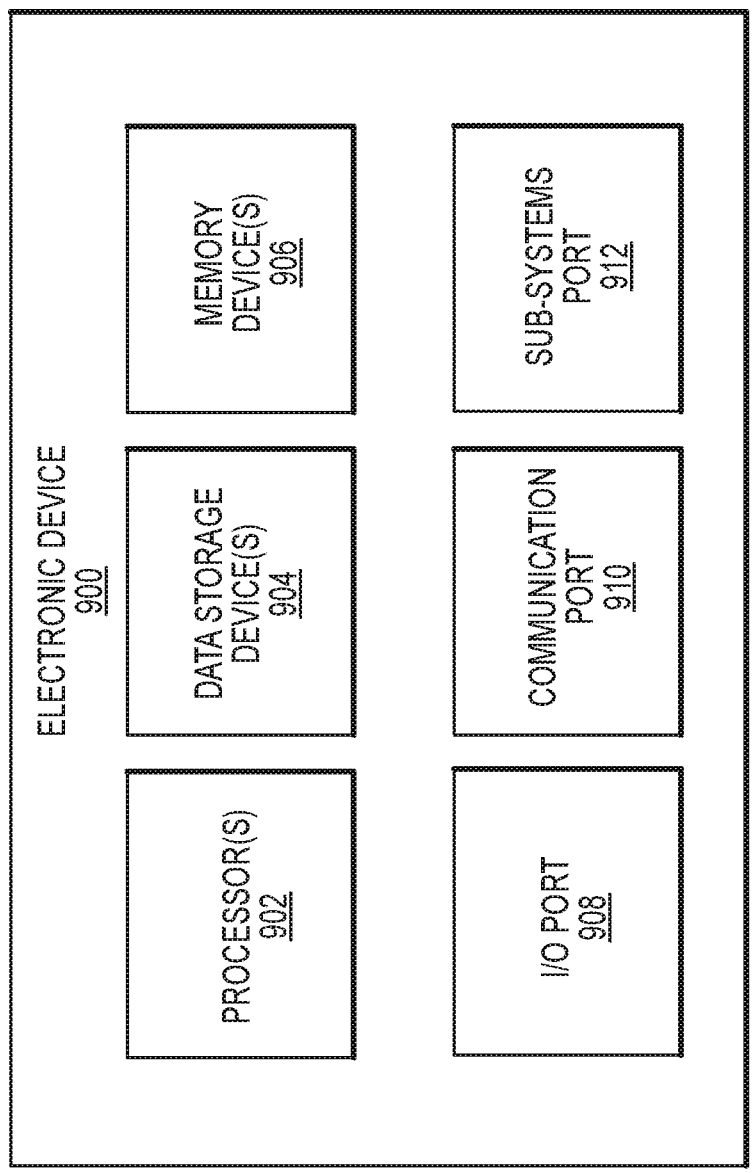
FIG. 9 is a functional block diagram of an electronic device including operational units arranged to perform various operations of the presently disclosed technology.

Referring to FIG. 9, a detailed description of an example computing system 900 having one or more computing units that may implement various systems and methods discussed herein is provided. The computing system 900 may be applicable to the sensor 100 and other computing or network devices processing sensor information (or configuring operation of the sensor). It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 9, including one or more hardware processors 902, one or more data storage devices 904, one or more memory devices 906, and/or one or more ports 908-912. Additionally, other elements that will be recognized by those skilled in the art may be included in the computing system 900 but are not explicitly depicted in FIG. 8 or discussed further herein. Various elements of the computer system 900 may communicate with one another by way of one or more communication buses, point-to-point communication paths, or other communication means not explicitly depicted in FIG. 9.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device(s) 906, and/or communicated via one or more of the ports 908-912, thereby transforming the computer system 900 in FIG. 9 to a special purpose machine for implementing the operations described herein.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908, a communication port 910, and a sub-systems port 912, for communicating with other computing, network, or vehicle devices. It will be appreciated that the ports 908-912 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 910 may communicate with an antenna for electromagnetic signal transmission and/or reception. In some examples, an antenna may be employed to receive Global Positioning System (GPS) data to facilitate determination of a location of a machine, vehicle, or another device.

The computer system 900 may include a sub-systems port 912 for communicating with one or more systems related to a vehicle to control an operation of the vehicle and/or exchange information between the computer system 900 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, surface monitoring information and software and other modules and services may be embodied by instructions stored on the data storage devices 804 and/or the memory devices 906 and executed by the processor 902. The computer system 900 may be integrated with or otherwise form part of a vehicle. In some instances, the computer system 900 is a portable device that may be in communication and working in conjunction with various systems or sub-systems of a vehicle, including the sensor (or sensors) 100.

The present disclosure recognizes that the use of such information may be used to the benefit of users. For example, the location information of a vehicle may be used to provide targeted information concerning a "best" path or route to the vehicle and to avoid surface hazards. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium; read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A sensor apparatus comprising:
a first ultrasonic transceiver positioned adjacent a second ultrasonic transceiver in a single integrated sensor module associated with a vehicle;
a waveform generator coupled with the first ultrasonic transceiver and the second ultrasonic transceiver and configured to provide a waveform for driving the first ultrasonic transceiver and the second ultrasonic transceiver in the single integrated sensor module;
an echo detector coupled with the first ultrasonic transceiver and the second ultrasonic transceiver in the single integrated sensor module; and
a first controllable phase delay element positioned to receive the waveform from the waveform generator and provide a phase delayed waveform to the first ultrasonic transceiver, the waveform generator, the echo detector, and the first controllable phase delay element housed within the single integrated sensor module, the first ultrasonic transceiver and the second ultrasonic transceiver providing an object detection beam extending outwardly from the vehicle in a field of view external to the vehicle, the object detection beam being steerable through a plurality of positions in the field of view by varying an amount of phase delay provided by the first controllable phase delay element, an echo strength increasing as the object detection beam is steered towards an object in the field of view and decreasing as the object detection beam is steered away from the object in the field of view.

2. The apparatus of claim 1 wherein the first ultrasonic transceiver and the second ultrasonic transceiver are a first piezoelectric element and a second piezoelectric element.

3. The apparatus of claim 1 wherein the phase delayed waveform has a phase difference of between 0 and 180 degrees.

4. The apparatus of claim 1 wherein the first ultrasonic transceiver and the second ultrasonic transceiver collectively provide the object detection beam and a second object detection beam when the first controllable phase delay element introduces a 180 degree phase difference in the phase delayed waveform.

5. The apparatus of claim 1 further comprising:
a third ultrasonic transceiver positioned adjacent the first ultrasonic transceiver and a fourth ultrasonic transceiver positioned adjacent the second ultrasonic transceiver to form a 2×2 array;
the waveform generator coupled with the first ultrasonic transceiver, the second ultrasonic transceiver, the third ultrasonic transceiver, and the fourth ultrasonic transceiver, and configured to provide a waveform for driving the first ultrasonic transceiver, the second ultrasonic transceiver, the third ultrasonic transceiver, and the fourth ultrasonic transceiver;
an echo detector coupled with the first ultrasonic transceiver, the second ultrasonic transceiver, the third ultrasonic transceiver, and the fourth ultrasonic transceiver; and
the first controllable phase delay element including at least one additional phase delay element, the first controllable phase delay element positioned to receive the waveform from the waveform generator and provide a first phase delayed waveform to the first ultrasonic transceiver and the at least one additional phase delay element to provide a second phase delayed waveform to at least the second ultrasonic transceiver.

6. A vehicle comprising:
a housing supporting a first ultrasonic transceiver positioned adjacent a second ultrasonic transceiver in a single integrated sensor module, the housing mounted on a vehicle body element such that the first ultrasonic transceiver and the second ultrasonic transceiver project at least one detection beam outwardly from the vehicle;
a common waveform generator in the single integrated sensor module and coupled with the first ultrasonic transceiver and the second ultrasonic transceiver and configured to provide a waveform for driving the first ultrasonic transceiver and the second ultrasonic transceiver;
a common echo detector in the single integrated sensor module and coupled with the first ultrasonic transceiver and the second ultrasonic transceiver; and
a first controllable phase delay element positioned in the single integrated sensor module the common waveform generator, the common echo detector, and the first controllable phase delay element positioned within the housing of the single integrated sensor module, the first controllable phase delay element configured to receive the waveform from the waveform generator and provide a phase delayed waveform to the first ultrasonic transceiver, the at least one detection beam being steerable through a plurality of positions by varying an amount of phase delay provided by the first controllable phase delay element, an echo strength of at least one echo detected by the common echo detector increasing as the at least one detection beam is steered towards an object and decreasing as the at least one detection beam is steered away from the object.

7. The vehicle of claim 6 wherein the first ultrasonic transceiver and the second ultrasonic transceiver are a first piezoelectric element and a second piezoelectric element.

8. The vehicle of claim 6 wherein the phase delayed waveform has a phase difference of between 0 and 180 degrees.

9. The vehicle of claim 6 wherein the first ultrasonic transceiver and the second ultrasonic transceiver collectively provide the object detection beam and a second object detection beam when the first controllable phase delay element introduces a 180 degree phase difference in the phase delayed waveform.

10. The vehicle of claim 6 wherein a first object detection beam is at least −20 degrees relative to a main object detection beam when the phase delay is zero, and a second object detection beam is at least +50 degrees relative to the main object detection beam when the phase delay is zero.

11. The vehicle of claim 6 further comprising:
a third ultrasonic transceiver positioned adjacent the first ultrasonic transceiver and a fourth ultrasonic transceiver positioned adjacent the second ultrasonic transceiver to form a 2×2 array;
the common waveform generator coupled with the first ultrasonic transceiver, the second ultrasonic transceiver, the third ultrasonic transceiver, and the fourth ultrasonic transceiver, and configured to provide a waveform for driving the first ultrasonic transceiver, the second ultrasonic transceiver, the third ultrasonic transceiver, and the fourth ultrasonic transceiver;
the common echo detector coupled with the first ultrasonic transceiver, the second ultrasonic transceiver, the third ultrasonic transceiver, and the fourth ultrasonic transceiver; and
the first controllable phase delay element including at least one additional phase delay element, the first controllable phase delay element positioned to receive the waveform from the waveform generator and provide a first phase delayed waveform to the first ultrasonic transceiver and the at least one additional phase delay element to provide a second phase delayed waveform to at least the second ultrasonic transceiver.

12. A method of detecting an object comprising:
providing a waveform to a first ultrasonic transceiver to generate a first wavefront using a waveform generator;
providing the waveform to a second ultrasonic transceiver to generate a second wavefront using the waveform generator, the first ultrasonic transceiver and the second ultrasonic transceiver in a single integrated sensor module associated with a vehicle, wherein the first wavefront and the second wavefront interact to produce a detection beam extending outwardly from the vehicle in a field of view external to the vehicle that intersects an object, the detection beam being steerable through a plurality of positions in the field of view by varying an amount of phase delay; and
receiving a first echo and a second echo at an echo detector, the waveform generator and the echo detector housed with a phase delay element within the single integrated sensor module, the first echo and the second echo from the intersection of the detection beam and the object, an echo strength increasing as the detection beam is steered towards the object in the field of view and decreasing as the detection beam is steered away from the object in the field of view.

13. The method of claim 12 further comprising:
phase delaying the waveform using the phase delay element to generate a phase delayed waveform to the first ultrasonic transceiver to generate a third wavefront, the third wavefront and the second wavefront steering the detection beam.

14. The method of claim 12 further comprising:
phase delaying the waveform to generate a plurality of phase delayed waveforms temporally offset from each other, the plurality of phase delayed waveforms steering the detection beam through at least seven positions covering 70 degrees of sweep.

15. The method of claim 12 further comprising:
phase delaying the waveform 180 degrees to generate a phase delayed waveform to the first ultrasonic transceiver to generate the first wavefront.

16. The sensor apparatus of claim 1, wherein the object detection beam provides contiguous detection volumes across at least one of a vertical field of view of a horizontal field of view, with a minimum beam step seize being a half-power beam width of the object detection beam.

17. The vehicle of claim 1, wherein the object detection beam provides contiguous detection volumes across at least one of a vertical field of view of a horizontal field of view, with a minimum beam step seize being a half-power beam width of the object detection beam.

* * * * *